United States Patent [19]

Whittemore et al.

[11] Patent Number: 4,506,022

[45] Date of Patent: Mar. 19, 1985

[54] SLIDE GATES

[75] Inventors: Dwight S. Whittemore, Bethel Park; David J. Michael, White Oak Boro, both of Pa.

[73] Assignee: Dresser Industries, Inc., Dallas, Tex.

[21] Appl. No.: 532,868

[22] Filed: Sep. 16, 1983

[51] Int. Cl.³ ............................................. C04B 35/52
[52] U.S. Cl. .................................. 501/100; 222/597; 222/598; 222/599
[58] Field of Search ................ 501/100; 222/597–599; 266/280, 287

[56] References Cited

U.S. PATENT DOCUMENTS 4,063,668 12/1977 Shapland et al. .................... 222/512
4,108,675 8/1978 Tomita et al. ....................... 501/100

Primary Examiner—James Poer
Attorney, Agent, or Firm—Barry E. Deutsch

[57] ABSTRACT

High alumina slide gate compositions comprising aluminous grain, carbonaceous material, high purity alumina, silicon metal and resin.

5 Claims, No Drawings

SLIDE GATES

The present invention is directed to high alumina slide gate plates that are used to control the flow of metal from metallurgical vessels. The slide gate may act as a rotary or reciprocating valve permitting the flow of molten metal from a metallurgical vessel. Alternately, it may act to throttle the flow of metal to some desired rate or to completely shut off the flow. One typical device is shown in U.S. Pat. No. 4,063,668.

A slide gate is subject to a variety of destructive forces in service, which include severe thermal stress and both erosion and corrosion by the molten metal and slag. When a slide gate is in operation, only a small portion of the plate is in contact with the molten metal flowing from the vessel. This portion in contact with the molten metal is heated rapidly. In contrast, the remaining portion of the plate is only heated by conduction. As a result, a large differential temperature exists across the plate. A temperature as high as 2900° F. may at metal-plate contact and as low as about 100° F. at the furthest edge of the plate. This large differential temperature causes severe thermal stress across the plate, which leads to cracking, spalling, chipping or peeling of the plate.

In addition to the high thermal stress in the slide gate, the rapid flow of metal through the valve is very aerosive and the repeated opening and closing of the slide gate valve causes metal and slag to freeze or stick in the slide gate track, which causes an erosion-type washing as well as a corrosive attack by the metal oxide from the slag.

It is among the objects of the invention to provide improved high alumina slide gate compositions that will resist thermal stress and have relatively high hot strength that will resist the erosive and corrosive effects of molten metal and slag.

Briefly, in accordance with the invention, there is provided a high alumina size graded batch. The batch comprises about 20 to 40%, by weight, of an aluminous grain. It also includes about 2 to 10%, by weight, of carbonaceous material, about 40 to 60% of high purity alumina, about 1 to 5% silicon metal, about 3 to 5% of liquid thermosetting resin.

In a preferred embodiment, the batch comprises the aluminous grain in the amount stated with at least about 50% mullite ($3Al_2O_3 \cdot 2SiO_2$), about 2 to 8% carbonaceous material and about 2 to 4% fine silicon metal.

The slide gate is formed on a suitable press and dried at a temperature to set the resin. The slide gate is heated to a temperature to decompose the resin to a degree to provide at least about 7% apparent porosity. However, it is preferred to heat the slide gate under stronger reducing conditions to a temperature of at least about 1800° F. The coked slide gate is then impregnated with a coal tar or petroleum pitch and baked in an oven above 250° F.

The various components in the slide gate or in its method of manufacture are intended to improve the thermal shock resistance and/or increase its cold or hot strength. The type and composition of the refractory grains used in manufacture of the slide gate play a major role in developing both hot strength and thermal shock resistance. Alumina grains or aluminous grains that contain at least 50% mullite have high strength; so, when used in a refractory, the strength of the refractory is largely dependent on the bonding phase. The thermal shock resistance can be improved by making the refractory structure as elastic as possible. This can be accomplished to a degree by using two refractory grains that have high temperature compatibility and yet have different thermal expansion coefficients. The alumina and mullite-containing grains meet these requirements.

A series of resin bonded slide gates containing a 5% addition of carbon were made with ratios of alumina to aluminous mullite grain of 100-0, 90-10, 80-20 and 70-30 mixes A, B, C and D respectively). The plates were tested for shock resistance by rapidly heating the plate with a propane-oxygen torch in a test referred to in the trade as a POFI test. In addition, the modulus of elasticity and other tests of the plates were measured as shown in Table I below.

TABLE I

| Mix Designation: | A | B | C | D |
| --- | --- | --- | --- | --- |
| Mix: | | | | |
| Aluminous Mullite Grain (70% $Al_2O_3$) | — | 9.5% | 19% | 28.5% |
| Alumina Grain | 95% | 85.5 | 76 | 66.5 |
| Graphite | 5 | 5 | 5 | 5 |
| Plus Additions: | | | | |
| Resin | | 4.5% | | |
| Hexamethylenetetramine | | 0.33% | | |
| Pressed at: | | 18,000 psi | | |
| Pressed Density, pcf: | 196 | 192 | 188 | 184 |
| Modulus of Rupture, psi | | | | |
| At Room Temperature (Av 3): | 5230 | 5690 | 5430 | 5080 |
| At 2000° F. (Av 3): | 1590 | 1430 | 1560 | 1420 |
| Crushing Strength at 2800° F. (Reducing Conditions psi (Av 5) | 3060 | 2450 | 2730 | 2250 |
| Modulus of Elasticity × $10^6$ psi | 11.44 | 10.10 | 8.73 | 9.10 |
| Propane Oxygen Flame Impingement Test | | | | |
| Degree of Cracking: | Moderate | None | Slight | None |
| Degree of Spalling: | None | None | Slight | Moderate |

Mix C had the lowest modulus of elasticity, which indicated it has the most elastic structure. From this result and results of the POFI test, the mix with an alumina/aluminous mullite grain ratio of 80/20 was judged to have the best thermal shock resistance.

The presence of carbon in the slide gate is one of the essential requirements of this invention and it is provided in a variety of ways. One is from the resin bond, another is as solid carbon particles and a third is from pitch or tar introduced by impregnation after coking the slide gate.

Either pitch or resin can be used in this invention to bond the brick during the pressing operation; however, resin is the preferred bonding agent. The resin that might be used include phenolic types, resorcinolformaldehyde, furan types and polyhydroxylpolyphenyl as examples. However, the resin must have the essential property that when pyrolysis occurs during coking, carbon will be deposited within the pores and around the aluminous and carbon materials forming a strong carbon bond.

A variety of carbon materials can be used in the slide gate mix that include flake graphite, amorphous graphite, carbon black, petroleum coke, coked anthracite coal and others. The carbon addition performs several functions in the slide gate composition. Carbon is not readily wetted by liquid metals or slag so it resists their penetration and erosion of the slide gate. The carbon also increases the resistance to cracking and spalling when the slide gate is rapidly heated by the flowing stream of molten metal.

A series of slide gates were made with the addition of 0, 5, and 10% flake graphite. These slide gates were coked in a reducing atmosphere, then impregnated with pitch. The thermal shock resistance of these slide gates was measured by the aforementioned POFI test. The five samples that contained 5 or 10% graphite did not spall, crack or fail in this test, but the brick with no carbon addition showed some cracking and spalling and failed the test. These results demonstrate the importance of the presence of carbon materials in the slide gate to resist thermal stress.

After the slide gate has been pressed and baked to thermoset the resin bond, the slide gate is coked under a strong reducing atmosphere, which converts the resin bond into a carbon bond. The coking step must be done at a sufficiently high temperature to cause pyrolysis of the resin to the extent that the coked brick has at least 7% apparent porosity. A coking temperature as low as 800° F. may be employed depending on the type of resin bond that is used, but preferably the temperature should be in the range of 1750° F. to 2250° F. to insure there is adequate for pitch impregnation.

Pitch impregnation of the coked slide gate is achieved by preheating the coked slide gate, then placing it into a heated vacuum chamber. The chamber is evacuated of all air and molten tar is pulled into the evacuated chamber until it covers the slide gate. Positive pressure is then applied to the chamber forcing the molten pitch into the pore structure of the slide gate. After the slide gate is fully impregnated, first the pitch, then the slide gate is removed from the chamber.

A batch containing 70% alumina, 20% aluminous mullite, 3% flake graphite, 5% carbon black and 2% fine silicon and bonded with 4.7% polyhydroxyl-polyphenyl resin was pressed into brick, dried to set the resin, then coked at 800° F., 1200° F., and 2000° F. A portion of the brick was tested after this treatment and after being impregnated with pitch and baked at 250° F. These results are shown in Table II below.

TABLE II

| Mix Designation: | E | F | G |
|---|---|---|---|
| Effect of Coking Temperature | | | |
| Coking Temperature: | 800° F. | 1200° F. | 2000° F. |
| Apparent Porosity, %: | 7.1 | 9.4 | 11.2 |
| Modulus of Rupture, psi: | 2830 | 1290 | 2510 |
| After Coking, Impregnation and Baking | | | |
| Modulus of Ruputure, psi | | | |
| Room Temperature | 2700 | 1490 | 4140 |
| at 2000° F. | 4670 | 4210 | 4820 |

The brick coked at 2000° F., impregnated and baked (Mix F) had excellent modulus of rupture of over 4000 psi at both room temperature and 2000° F. While hot strength is important, high room temperature strength is also important as it makes possible the grinding of a very smooth surface on the slide gate.

The data in Table II shows how the impregnation of a coked refractory with pitch increases the hot strength.

These brick contained 2% silicon, which was a factor in increasing the hot strength.

Another series of brick were made 30% aluminous mullite grain, about 70% alumina grain, 0, 2 and 4% silicon powder and bonded with resin. These brick were pressed, baked at 300° F., coked at 1200° F., impregnated with pitch then baked at 500° F.

TABLE III

| Mix Designation | H | I | J |
|---|---|---|---|
| Silicon Powder, %: | 0 | 2 | 4 |
| Effect of Silicon on Dried Brick: | | | |
| Hot Crushing at 2700° F.: | 2500 | 4180 | 3990 |
| Effect of Silicon After Coking and Tar Impregnation: | | | |
| Modulus of Rupture at 2000° F.: | 2760 | 4140 | 4560 |

These results demonstrated the significant effect the silicon addition has on hot strength.

A chemical analysis of the aluminous and graphite materials is shown in Table IV below.

TABLE IV

| | Alumina Grain | Aluminous-Mullite Alumina Grain 70% Alumina |
|---|---|---|
| Calcined Basis | | |
| Silica ($SiO_2$) | 0.1% | 26.4% |
| Alumina ($Al_2O_3$) | 99.6 | 69.3 |
| Iron Oxide ($Fe_2O_3$) | 0.2 | 1.0 |
| Titania ($TiO_2$) | 0.01 | 3.2 |
| Lime (CaO) | 0.04 | 0.02 |
| Magnesia | 0.04 | 0.04 |

| | Flake Graphite | Amorphous Graphite |
|---|---|---|
| Dry Basis | | |
| Silica ($SiO_2$) | 6.7% | 9.1% |
| Alumina ($Al_2O_3$) | 3.2 | 3.7 |
| Iron Oxide ($Fe_2O_3$) | 1.1 | 1.6 |
| Titania ($TiO_2$) | 0.05 | 0.22 |
| Lime (CaO) | 0.62 | 0.84 |
| Total Alkalies | — | 0.62 |
| Carbon (C) | 88.1 | 83.6 |

It is intended that the forgoing description be construed as illustrative and not in limitation of the invention.

The embodiments of the invention in which an exclusive property or privilege is claimed are defined as follows:

1. High alumina slide gate composition comprising about 20 to 40%, by weight, of aluminous grain, about 2 to 10%, by weight, of carbonaceous material, about 40 to 60%, by weight, of high purity alumina, about 1 to 5% of silicon metal and about 3 to 5%, by weight, of liquid thermosetting resin.

2. Composition of claim 1, in which the aluminous grain contains at least about 50% mullite.

3. Composition of claim 1, in which there is present about 2 to 8% carbonaceous material.

4. Composition of claim 1, in which the carbonaceous material is graphite.

5. Composition of claim 1, in which there is about 2 to 4% silicon metal.

* * * * *